United States Patent [19]

Hänsel et al.

[11] Patent Number: 5,162,457
[45] Date of Patent: Nov. 10, 1992

[54] HOT MELT ADHESIVES

[75] Inventors: Eduard Hänsel, Wuppertal-Elberfeld; Walter Meckel, Neuss; Klaus König; Otto Ganster, both of Odenthal; Horst Stepanski, Leverkusen, all of Fed. Rep. of Germany

[73] Assignee: Bayer Aktiengesellschaft, Leverkusen, Fed. Rep. of Germany

[21] Appl. No.: 785,653

[22] Filed: Oct. 31, 1991

[30] Foreign Application Priority Data

Nov. 7, 1990 [DE] Fed. Rep. of Germany ....... 4035280

[51] Int. Cl.$^5$ .............................................. C08L 75/00
[52] U.S. Cl. ................... 525/454; 525/458; 524/196; 524/773; 528/49; 528/905
[58] Field of Search ................ 525/454, 458; 524/196, 524/773; 528/49, 905

[56] References Cited

U.S. PATENT DOCUMENTS

| 4,585,819 | 4/1986 | Reischle et al. | 525/458 |
| 4,999,407 | 3/1991 | Gilch et al. | 525/457 |
| 5,019,638 | 5/1991 | Müller et al. | 528/83 |

FOREIGN PATENT DOCUMENTS

| 448825 | 10/1961 | European Pat. Off. |
| 3230009 | 3/1983 | Fed. Rep. of Germany . |
| 3932018 | 4/1991 | Fed. Rep. of Germany . |
| 4005390 | 8/1991 | Fed. Rep. of Germany . |
| 1540634 | 2/1979 | United Kingdom . |
| 2137638 | 10/1984 | United Kingdom . |

Primary Examiner—Maurice J. Welsh
Assistant Examiner—Rachel Johnson
Attorney, Agent, or Firm—Joseph C. Gil; Godfried R. Akorli

[57] ABSTRACT

This invention relates to crystalline, isocyanate group-containign hot melt adhesives based on from 70-95% by weight of a prepolymer A based on polyester diols having a molecular weight of from 1500 to 10,000 and melting points of from 50° to 90° C. and diisocyanates in a ratio of isocyanate groups of the diisocyanate to the hydroxyl groups of the polyester diol of from 3:1 to 1.2:1 and from 5-30% by weight of a component B having a molecular weight of from 1000 to 10,000 based on polyesters having melting points of from 60° to 150° C., in which component B contains at most 0.5 Zerewitinow active groups per molecule.

7 Claims, No Drawings

HOT MELT ADHESIVES

BACKGROUND OF THE INVENTION

1. Field of the Invention

The present invention relates to new crystalline hot melt adhesives containing isocyanate groups.

2. Brief Description of the Prior Art

Methods of producing joints by means of solvent-free hot melt adhesives having a solids content of 100% are nowadays becoming increasingly important since the use of systems containing solvents require expensive plants for the recovery of the solvents and the use of aqueous dispersion or solution systems requires evaporation of the water, which may also be highly cost intensive in some circumstances. Hot melt adhesives offer a technological alternative which is already widely used. Their advantages lie in the fact that when applied as hot melts, they rapidly solidify on cooling and build up strength. One disadvantage is that the bonding of heat-sensitive substrates is made difficult by the high melting temperatures of these adhesives. Also, if the adhesive is not further processed as soon as it has been applied, it rapidly solidifies into a state in which it can no longer be wetted and can then only be reactivated by heat under extreme temperature conditions. Further, due to the thermoplastic character of the hot melt adhesives, their bonds have only a limited heat distortion temperature range.

An elegant method by which the properties of hot melt adhesives can be obtained by building up strength on cooling can be utilized at low temperatures but the bonds produced by the adhesives will nevertheless have high heat strength. Such a bonding process is already described in principle in DE-PS 878,827 and DE-OS 2,609,266, which uses reactive hot melt systems based on isocyanate-containing prepolymers of diisocyanates and polyester diols having melting ranges above 40° C. Owing to their low molecular weights, the products are liquid and processible at temperatures only slightly above the melting range of the polyesters and attain a sufficiently high molecular weight after a chain lengthening reaction has taken place on the substrate. Combined with the recrystallization of the crystalline soft segments, this results in an increased initial strength while the final strength is achieved by complete reaction of, for example, atmospheric moisture with the free isocyanate groups still present, to form linear, high molecular weight polyurethane polyureas. In the very rapid cycles nowadays customary in industry, it is precisely the necessary pre-lengthening of the isocyanate-containing prepolymers which constitutes a step which is difficult to reproduce and which, if not sufficiently completed, results in faulty adhesive bonds owing to the low cohesive strength, whereas if carried too far has the result that the adhesive layer obtained can no longer be sufficiently activated because the molecular weight is already too high.

Another means of producing reactive hot melts is described in EP-A 340,906. The hot melts mentioned there appear to fulfill the requirements for rapid cycles, but the products are expensive to produce due to the use of two amorphous prepolymers differing in their glass transition temperatures, and further, the viscosities of the products are higher owing to the higher glass points, so that higher processing temperatures are required for sufficiently wetting the substrates.

DE-P 3,932,018.9 is aimed in a similar direction, namely the rapid attainment of a higher initial strength. According to the said specification, more rapid crystallization is achieved by mixing two polyesters having differing melting points. Reactive hot melts based on relatively high melting polyesters are described in EP-A 354,527. Systems of this type based on, for example, dodecanoic diacid hexanediol polyesters crystalline very rapidly but are liable to form very brittle systems in the fresh state. This disadvantage is overcome in the products described in DE-P 4,005,390.8 and P 4,016,717.8 but even these products are limited in their capacity for crystallization at elevated temperatures.

Apart from this physical behavior of the adhesive applied to its substrate, the dosed application of the hot melt adhesives is a problem, particularly when the surfaces of the substrates are not planar so that the adhesives cannot be applied by means of, for example, rollers or broad sheeting dies. Various systems have been offered by the industry to deal with this problem. The application of a spun bonded material is particularly suitable for controlled application of the adhesive to a substrate which may be irregular. For such forms of application, the adhesive is required to have certain rheological properties to ensure a problem-free application in practice. It would therefore be desirable to have a bonding process which is technically simple to realize and can be incorporated in rapid machine cycles even under unfavorable conditions and yet can be carried out with relatively low melting adhesives capable of being activated at moderate temperatures.

SUMMARY OF THE INVENTION

The present invention thus relates to crystalline, isocyanate group-containing hot melt adhesives containing from 70–95% by weight of a prepolymer A based on
polyester diols having a molecular weight of from 1500 to 10,000 and melting points from 50° to 90° C. and diisocyanates in a ratio of isocyanate groups of the diisocyanate to hydroxyl groups of the polyester diol of from 3:1 to 1.2:1 and from 5–30% by weight of a component B having a molecular weight from 1000 to 10,000 based on polyesters having melting points from 60° to 150° C., characterized in that component B contains at most 0.5 Zerewitinow active groups per molecule.

A similar procedure is already described in EP-A 19 159, in which an isocyanate group-containing prepolymer is mixed with crystalline, unreactive carbamic acid esters based on isocyanates and alcohols. Such mixtures, however, do not show the effect of more rapid crystallization at elevated temperatures but if anything behave less favorably in this respect (see Example 9).

The nature of the invention is most clearly documented by the fact that a reactive hot melt system based on a dodecanoic diacid/hexanediol polyester and diphenylmethane diisocyanate shows no tendency to crystallize at 55° C. within 10 minutes, whereas a system according to the invention on the same basis containing 10% by weight of a reaction product of the same polyester with 2 mol of phenylisocyanate crystallizes after only two minutes and thus builds up initial strength (see Examples 2 and 2a).

It is surprisingly found that adhesives of this type can readily be sprayed in a web of non-woven structure and can easily be thermally activated, provided not too long an interval, namely at most 6 to 8 hours, elapses between application of the adhesive and its activation.

Above all, a rapid machine cycle is obtained with the adhesives according to the invention since the bonds have a high initial strength.

DETAILED DESCRIPTION OF THE INVENTION

The preparation of the polyester used as component A is carried out by conventional methods of solvent-free condensation of the dicarboxylic acids with an excess of the diol component at temperatures of from 180 to 280° C. Catalysts or entrainers such as toluene, for example, may, of course, also be used. The said polyesters may, of course, also be prepared by the transesterification of dicarboxylic acid esters with diols. The carbonic acid esters are preferably obtained by the transesterification of carbonic acid esters such as, for example, diphenyl carbonate or diethyl carbonate with an excess of diols.

Preferred polyester diols are those derived from dicarboxylic acids with even numbers of carbon atoms, such as hexanoic, octanoic, decanoic or dodecanoic diacid, and even numbered diols such as, for example, butane, hexane, octane or dodecane diol. Polyester diols based on hexane diol-(1,6) and adipic acid or dodecanoic diacid are particularly preferred. The molecular weights should generally be from 1500 to 10,000, and preferably from 2000 to 6000.

The polyisocyanates used for the preparation of the prepolymer may be any substantially bifunctional isocyanates such as, for example, hexamethylene diisocyanate, isophorone diisocyanate, tolylene diisocyanate, diphenyl methane diisocyanates and/or diphenylmethane diisocyanates substituted with methyl groups, but 4,4'-diphenylmethane diisocyanate containing up to 80% of 2,4-diphenylmethane diisocyanate are preferably used.

The ratio of isocyanate reactive groups in the polyol component to isocyanate groups in the diisocyanate may vary within wide limits. The ratio of isocyanate groups to isocyanate reactive groups should generally be from 3:1 to 1.2:1, typically from 2.3:1 to 1.4:1, and preferably from 2.1:1 to 1.6:1.

Polyfunctional aliphatic isocyanates obtained, for example, by the trimerization or biuretization of hexamethylene diisocyanate may also be included in quantities of from 0.1% to 5% for increasing the heat distortion temperature of the adhesive bond. Such products may be modified with hydrophilic polyethers.

The low molecular weight diols optionally used may in particular be di-, tri- and/or tetraethylene glycol, 1,4-dimethylolcyclohexane or reaction products of 4,4'-hydroxyphenylpropane with ethylene oxide and/or propylene oxide. A proportion of diols containing ions and/or units giving rise to ionic groups may, of course, also be used for special effects, for example: Dimethylolproprionic acid, n-methyldiethanolamine and/or reaction products of sodium bisulphite with propoxylated butene 1,4-diol. Particularly suitable polyester diols for the preparation of this component are the above-mentioned, relatively high melting polyester diols based on hexanoic, octanoic or decanoic diacid with, for example, hexane or dodecane diol, dodecanoic diacid with butane or hexane diol, and terephthalic acid with hexane diol. The molecular weight of the polyesters should be from 1000 to 10,000, preferably from 2000 to 8000, most preferably from 3000 to 6000.

It is essential for this invention that component B should contain little or no Zerewitinow active hydrogen atoms, i.e. from 0 to 0.5, and preferably from 0 to 0.2 such hydrogen atoms per molecule. This may be achieved by various methods. For example, a certain quantity of monofunctional acids or alcohols may be included in the preparation of the polyesters, but the result is most simply achieved by reacting the polyester diols with monofunctional isocyanates such as, for example, phenyl isocyanate, hexane isocyanate, cyclohexyl isocyanate or stearyl isocyanate. It may also be achieved by using excess of diisocyanate such as hexamethylene diisocyanate or tolylene diisocyanate, followed by a reaction of the excess isocyanate with monofunctional alcohols such as, for example, n-butanol or octanol or monoamines such as dibutylamine.

The melting range of component B is also important and should be from 60° to 150° C., most preferably from 70° to 145° C., expressed by the endothermal maximum in differential thermoanalysis.

Preparation of the isocyanate group-containing hot melt systems may be carried out by, for example, mixing the liquid polyester with component B, and with an excess of polyisocyanate and filling the resulting homogeneous mixture into a container or stirring until the isocyanate value is constant and then filling the mixture into a container. Reaction temperatures from 60° to 150° C. are employed, preferably from 65° to 110° C. The reactive hot melt may, of course, also be prepared continuously in a cascade of stirrer vessels or suitable mixing apparatus such as, for example, mixers rotating at high speed on the rotor-stator principle.

Alternatively, the polyester may first be reacted with the polyisocyanate separately from component B and the isocyanate group-containing prepolymer may then be mixed with the molten component B in the ratio provided by the invention and filled into containers.

The polyester or a part thereof may, of course, be modified with a subequivalent quantity of diisocyanates, preferably hexamethylene diisocyanate, and after completion of the reaction, the urethane group-containing polyester diols may be reacted with an excess of diisocyanates after the addition of component B to form a hot melt containing isocyanate groups.

The proportion of component B should be from 5 to 30% by weight of the total mixture, preferably from 10 to 25% by weight. The hot melt systems have an almost unlimited shelf life if stored under conditions of exclusion of moisture at a room temperature of 25° C. They may be modified with fillers such as, for example, heavy spar or polymer powders, dyes, resins and/or extender oils and are excellent adhesives. The systems may be improved in their resistance to hydrolytic influences by the addition of carbodiimides.

The adhesives are applied at an elevated temperature, the hot melt systems being melted continuously or intermittently at temperatures of from 80° to 160° C. and the melt being brought into contact with the substrates which are to be bonded.

Application to at least one of the surfaces to be bonded may be carried out by means of rollers or nozzles or most preferably by spinning the hot melt with a hot air stream.

Due to the rapid crystallization of the hot melt, the parts to which the adhesive has been applied can be stacked for a short time without sticking together, but the time interval between application of the adhesive and bonding should not be too long, otherwise problems of activation may arise. The possible time interval is about 3 to 5 or at most 8 hours and depends on external conditions such as temperature and atmospheric moisture. Such intermediate storage is, however, by no means necessary and in this respect the adhesives according to the invention are distinguished from the state of the art adhesives described, for example, in 2 609 266, in which intermediate storage is absolutely necessary for further increase in molecular weight. It is thus particularly preferred to carry out a continuous process in which, after application of the hot melt to one of the surfaces to be bonded, this surface is joined to the other, optionally a preheated surface which is free from adhesive, and the bond passes through the stage to the finished article under pressure and optionally shaping.

Setting of the adhesive at first takes place physically by recrystallization of the polyester segments and later by a chemical reaction of the isocyanate groups with moisture or other Zerewitinow active groups.

The moisture of the substrate and the atmospheric moisture are normally sufficient for setting but the reaction so may, of course, be accelerated by spraying with water or media containing glycols and/or catalysts. The products may be used as adhesives for a wide variety of materials, such as wood, products containing wood, glass, ceramics or solid or foamed synthetic resins such as PVC, ABS, polyethylene or polypropylene and each of these materials may be bonded to itself or to one of the other materials. The adhesives may be used for a wide variety of applications such as, for example, as assembly adhesives for temporarily fixing structural parts in position, as bookbinding adhesives, in which the rapid crystallization results in early build-up of strength, thereby enabling rapid cycles to be obtained in conventional bookbinding machines, or for the rational production of bonds between flat surfaces, such as for example hat racks or some inner parts of motor vehicles.

The invention is further illustrated but is not intended to be limited by the following examples in which all parts and percentages are by weight unless otherwise specified.

EXAMPLES

Polyester polyols A

A-1 Hydroxyl polyester of adipic acid and hexane 1,6-diol
M.wt. 4,000
Hydroxyl number 28
EP: (softening point): 55° C.

A-1 Hydroxyl polyester of dodecanoic diacid and hexane-1,6-diol
M.wt. 2,000
Hydroxyl number 57
EP: 72° C.

A-3 Hydroxyl polyester of dodecanoic diacid and hexane-1,6-diol
M.wt. 4,500
Hydroxyl number 25
EP: 72° C.

A-4 Hydroxyl polyester of dodecanoic diacid and dodecane-1,6-diol
M.wt. 2,000
Hydroxyl number 54
EP: 83° C.

A-5 Hydroxyl polyester of dodecanoic diacid and dodecane diol
M.wt. 5,000
Hydroxyl number 23
EP: 86° C.

A-6 Hydroxyl polyester of terephthalic acid and hexane-1,6-diol
M.wt. 1,250
Hydroxyl number 91
EP: 142° C.

A-7 Hydroxyl polyester of sebacic acid and hexane diol
M.wt. 2,000
Hydroxyl number 57
EP: 65° C.

Isocyanates

C-1 4,4-Diisocyanatodiphenylmethane
C-2 Hexamethylene diisocyanate
C-3 Phenyl isocyanate
C-4 Stearyl isocyanate (15.9% NCO)
C-5 Trimer of hexamethylene diisocyanate (Desmodur ® N 3300)

Preparation of Component B

The hydroxyl polyesters are dehydrated and reacted with the isocyanates at 100 to 150° C.

| | Polyester | Isocyanate | Alcohol | Melting point (°C.) |
|---|---|---|---|---|
| B-1 | 2000 g | A-2 238 g | C-3 | 73 |
| B-2 | 2000 g | A-2 564 g | C-4 | 72 |
| B-3 | 2000 g | A-2 252 g | C-2 | 74 g n-butanol | 74 |
| B-4 | 4500 g | A-3 238 g | C-3 | 76 |
| B-5 | 2000 g | A-4 238 g | C-3 | 84 |
| B-6 | 5000 g | A-5 238 g | C-3 | 86 |
| B-7 | 1250 g | A-6 238 g | C-3 | 138 |
| B-8 | 2080 g | A-7 238 g | C-3 | 67 |
| B-9 | | 250 g | C-1 | 260 g n-octanol | 130 |

Zerewitinow active groups were not detected.

PREPARATION OF THE PREPOLYMERS

The melted polyester polyols A and component B are mixed together and dehydrated for 60 minutes at 90° to 120° C. and at about 20 mm Hg with stirring.

The isocyanates are added at about 80° to 90° C. and the reaction mixture is stirred under a film of nitrogen until the isocyanate content is constant.

The prepolymer is filled into cartridges.

INVESTIGATION OF THE HOT MELT SYSTEMS

After two weeks storage at room temperature, the cartridges are melted in a heating cupboard at 130° to 140° C. for 60 minutes.

The isocyanate content of the liquid prepolymer is determined by titration with dibutylamine.

The liquid hot melt is applied to samples of beechwood according to DE 3,931,845 and the curing characteristic, subdivided into a wetting phase A (seconds) and crystallization phase B (seconds) is determined with the "CUREM" in a climatic chamber at 45° to 55° C., the total observation period being 10 minutes.

| Examples | Pol-A (g) | Component O (g) | Diiso. C (g) | NCO |
|---|---|---|---|---|
| 1 | 1000 A-1 | 112 B-1 | 125 C-1 | 1.55 |
| 2 | 1000 A-3 | 110 B-4 | 97 C-1 | 1.05 |
| 3 | " | 110 B-5 | " | 1.08 |
| 4 | " | 110 B-6 | " | 1.10 |
| 5 | " | 110 B-3 | " | 1.05 |
| 6 | " | 110 B-1 | " | 1.12 |
| 7 | " | 110 B-2 | " | 1.05 |
| 8 | " | 110 B-7 | " | 1.03 |
| 9 | " | 110 B-8 | " | 1.09 |
| 10 | " | 110 B-4 | " + 36 C-5 | 1.60 |

| Comparison | Pol-A (g) | Component B (g) | Diiso. C (g) | NCO |
|---|---|---|---|---|
| 1-a | 1000 A-1 | — | 125 C-1 | 1.65 |
| 2-a | 1000 A-3 | — | 97 C-1 | 1.23 |
| 9 | 1000 A-3 | 110 B-9 | 97 C-1 | 1.08 |

-continued

| | Results | | | |
|---|---|---|---|---|
| | 45°C Test | | 55°C Test | |
| | Wetting | Crystallization | Wetting | Crystallization |
| 1 | 360 | 240+ | >600 | None |
| 2 | 55 | 35 | 120 | 480+ |
| 3 | 70 | 90 | 130 | 160 |
| 4 | 40 | 15 | 80 | 150 |
| 5 | 70 | 60 | 300 | 300+ |
| 6 | 50 | 60 | 270 | 270 |
| 7 | 70 | 50 | 360 | 240+ |
| 8 | 60 | 70 | 250 | 300 |
| 9 | 60 | 120 | 360 | 240+ |
| 10 | 60 | 40 | 130 | 450 |

| | Comparison | | | |
|---|---|---|---|---|
| | 45°C Test | | 55°C Test | |
| | Wetting | Crystallization | Wetting | Crystallization |
| 1-a | >600 | none | >600 | none |
| 2-a | 80 | 90 | >600 | none |
| 9 | 50 | 70 | >600 | none |

+ = crystallization phase is not yet completed at the end of the experimental time of 10 minutes.

What is claimed is:

1. Crystalline hot melt adhesives containing isocyanate groups, based on
   from 70-95% by weight of a prepolymer A based on polyester diols having a molecular weight of from 1500 to 10,000 and melting point of from 50° to 90° C. and diisocyanate in a ratio of isocyanate groups of the diisocyanate to hydroxyl groups of the polyester diol of from 3:1 to 1.2:1 and
   from 5-30% by weight of a component B having a molecular weight of from 1000 to 10,000 based on polyesters having a melting point of from 60° to 150° C., characterized in that component B contains at most 0.5 Zerewitinow active groups per molecule.

2. Hot melt adhesives according to claim 1, characterized in that the diisocyanate is 4,4'-diphenyl methane diisocyanate.

3. Hot melt adhesives according to claim 1, characterized in that a polyfunctional aliphatic isocyanate is additionally added.

4. Hot melt adhesives according to claim 1, characterized in that component B comprises a reaction product of a polyester diol and a monoisocyanate.

5. Hot melt adhesives according to claim 1, characterized in that component B is a polyester having a molecular weight of from 3000 to 6000 which is a reaction product of dodecanoic diacid and hexanediol.

6. Hot melt adhesives according to claim 1, characterized in that the prepolymer A is based on a polyester diol of adipic acid and hexanediol and is of a molecular weight of from 2000 to 6000.

7. Hot melt adhesives according to claim 1, characterized in that prepolymer A is based on a polyester diol of dodecanoic diacid and hexanediol, and is of a molecular weight of from 2000 to 6000.

* * * * *